(12) United States Patent
Verma et al.

(10) Patent No.: US 6,597,461 B1
(45) Date of Patent: Jul. 22, 2003

(54) TUNABLE FABRY-PEROT INTERFEROMETER USING ENTROPIC MATERIALS

(75) Inventors: Ravi K. Verma, Pasadena, CA (US);
Michael J. Little, Oak Park, CA (US);
Thomas S. Tyrie, Oak Park, CA (US);
John J. Lyon, San Marcos, CA (US);
Ron Pollock, Van Nuys, CA (US)

(73) Assignee: Parvenu, Inc., Westlake Village, CA (US)

( * ) Notice: Subject to any disclaimer, the term of this patent is extended or adjusted under 35 U.S.C. 154(b) by 298 days.

(21) Appl. No.: 09/766,687

(22) Filed: Jan. 19, 2001

Related U.S. Application Data
(60) Provisional application No. 60/213,480, filed on Jun. 23, 2000, provisional application No. 60/209,992, filed on Jun. 8, 2000, and provisional application No. 60/190,110, filed on Mar. 20, 2000.

(51) Int. Cl.[7] .................................................. G01B 9/02
(52) U.S. Cl. ....................................................... 356/519
(58) Field of Search ................................ 356/519, 454, 356/480; 359/577, 578, 579

(56) References Cited

U.S. PATENT DOCUMENTS

| | | |
|---|---|---|
| 4,203,128 A | 5/1980 | Guckel et al. |
| 4,400,058 A | 8/1983 | Durand et al. |
| 4,553,816 A | 11/1985 | Durand et al. |
| 4,566,935 A | 1/1986 | Hornbeck |
| 4,825,262 A | 4/1989 | Mallinson |
| 4,859,060 A | 8/1989 | Katagiri et al. |
| 5,068,861 A | 11/1991 | Abbott et al. |
| 5,313,333 A | 5/1994 | O'Brien et al. |
| 5,381,232 A | 1/1995 | Van Wijk |
| 5,383,168 A | 1/1995 | O'Brien et al. |
| 5,461,507 A | 10/1995 | Westland et al. |
| 5,510,914 A | 4/1996 | Liu et al. |
| 5,561,523 A | 10/1996 | Blomberg et al. |
| 5,822,110 A | 10/1998 | Dabbaj |
| 5,917,647 A | 6/1999 | Yoon |
| 5,970,190 A | 10/1999 | Fu et al. |
| 6,078,395 A | 6/2000 | Jourdain et al. |
| 6,137,819 A | 10/2000 | Najda |
| 6,324,192 B1 * | 11/2001 | Tayebati ...................... 372/20 |
| 6,335,817 B1 | 1/2002 | Phillipps |
| 6,400,738 B1 | 6/2002 | Tucker et al. |

FOREIGN PATENT DOCUMENTS

| | | |
|---|---|---|
| EP | 0 702 205 A2 | 8/1995 |
| WO | WO 99/34484 | 7/1999 |

OTHER PUBLICATIONS

P. Tayebati et al.; "Widely Tunable Fabry–Perot filter Using Ga(Al)As–AlO$_x$Deformable Mirrors"; IEEE Photonics Technology Letters, vol. 10, No. 3, Mar. 1998; pp. 394–396.

P. Tayebati et al.; "Microelectromechanical tunable filters with 0.47nm linewidth and 70nm tuning range"; Electronics Letters; Jan. 8, 1998; vol. 34, No. 1; pp. 76–78.

(List continued on next page.)

*Primary Examiner*—Samuel A. Turner
*Assistant Examiner*—Patrick Connolly
(74) *Attorney, Agent, or Firm*—Fleshner & Kim, LLP

(57) ABSTRACT

A cost-effective broadband tunable Fabry-Perot interferometer uses entropic, rather than enthalpic, materials to provide the compliant support for the interferometer's movable mirror. Entropic materials exhibit an entropic plateau region over a wide frequency range with a Young's modulus much lower than enthalpic materials, linear elastic behavior over a wide deformation range, and, in certain geometries, energy and stress behavior that tend to stabilize the movable mirror during deformation. The compliant support can be configured in a variety of geometries including compression, tension, sheer and diaphragm and of a variety of materials including elastomers, aerogels or other long chained polymers.

36 Claims, 15 Drawing Sheets

Tensile

OTHER PUBLICATIONS

M.C. Larson et al.; "Vertical Coupled–Cavity Microinterferometer on GaAs with Deformable–Membrane Top Mirror"; IEEE Photonics Technology Letters, vol. 7, No. 4, Apr. 1995; pp. 382–384.

K. Aratani et al.; "Process and Design Considerations for Surface Micromachined Beams for a Tunable Interferometer Array in Silicon"; Proc. IEEE Micro Electro Mechanical Systems, Ft. Lauderdal, FL, 1993, pp. 230–235.

MEM–TUNE Tunable Filter; Preliminary Data Sheet; May 2000.

OPM–1 Optical Performance Monitor; Preliminary Data Sheet; May 2000.

GTM–1 EDFA Gain–Tilt Monitor; Preliminary Data Sheet; May 2000.

J. H. Jerman et al.; "Miniature Fabry–PErot Interferometers Micromachined in Silicon for use in Optical Fiber WDM Systems"; Transducers '91, International Solid–State Conference on Sensors and Actuators, pp. 372–375 (1991) IEEE, pp. 472–475.

P. Tayebati; "Microelectromechanical tunable filter with stable haft symmetric cavity"; Electronics Letters–IEEE, 1998, p. 1967.

Joost C. Lotters et al.; "Polydimethylisiloxane as an elastic material applied in a capacitive accelerometer"; (1996); J. Micromech. Microeng. 6 (1996) pp. 52–54.

P. Bley; "Polymers–an Excellent and Increasingly Used Material for Microsystems"; Sep. 1999; SPIE vol. 3876; pp. 172–184.

Thorbjorn Ebeforst et al.; "New small radius joints based on thermal shrinkage of polyimide in V–grooves for robust self–assembly 3D microstructures"; J. Micromech. Microeng. 8 (1998); pp. 188–194.

M Pedersent et al.; "A capacitive differential pressure sensor with polyimide diaphragm"; J. Micromech. Microeng. 7 (1997); pp. 250–252.

Frank Niklaus et al.; "Low–temperature full wafer adhesive bonding"; J. Micromech. Microeng. 11 (2001); pp. 100–107.

Kenji Suzuki et al.; "Insect–Model Based Microrobot with Elastic Hinges"; Journal of Microelectromechanical Systems, vol. 3, No. 1, Mar. 1994; pp. 4–9.

K. Minami et al.; "Fabrication of Distributed Electrostatic Micro Actuator (DEMA)"; Journal of Microelectromechanical Systems, vol. 2, No. 3, Sep. 1993; pp. 121–127.

Cheol–Hyun Han et al.; "Parylene–Diaphragm Piezoelectric Acoustic Transducers"; The Thirteenth Annual International Conference on Microelectromechanical Systems; (2000), pp. 148–152.

Krzysztof A R B Pietraszewski et al.; "Cryogenic servo–stabilised Fabry–Perot Interferometer for imaging at 2–2.5microns"; SPIE Proceedings, vol. 2814 (1996); pp. 139–146.

T R Hicks et al.; "The application of capacitance micrometry to the control of Fabry–Perot etalons"; J. Phys. E. Instrum., vol. 17, 1984, pp. 49–55.

E. Ollier et al.; "Micro–Opto–Electro–Mechanical Systems: Recent developments and LETI's acitivities"; SPIE; vol. 4075; pp. 12–21.

T. R. Hicks et al.; "The application of capacitance micrometry to the control of Fabry–Perot etalons"; J. Phys. E: Sci. Instrum., vol. 17, 1984; pp. 49–55.

* cited by examiner

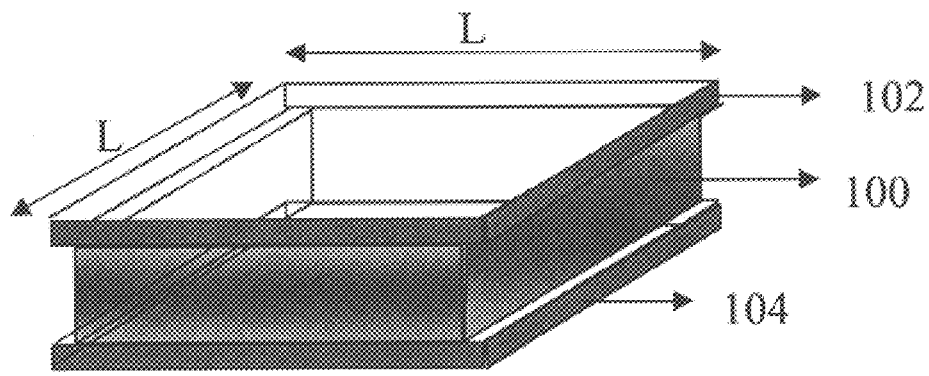
Fig 8a
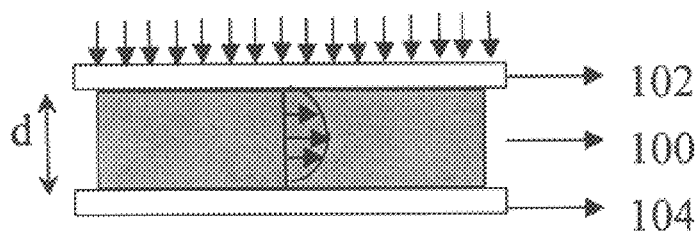
Fig 8b
Fig 8

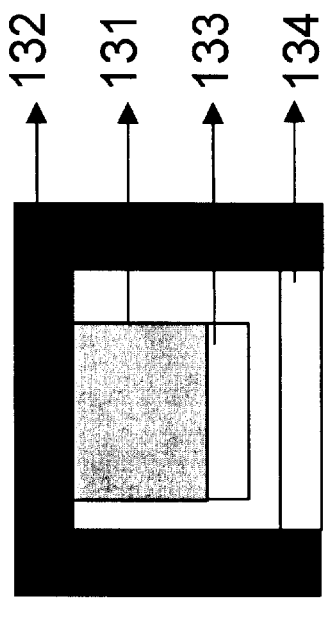
Figure 11(b):Tensile
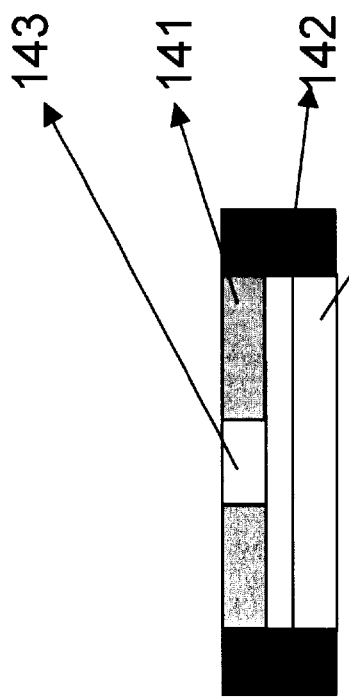
Figure 11(c):Diaphragm
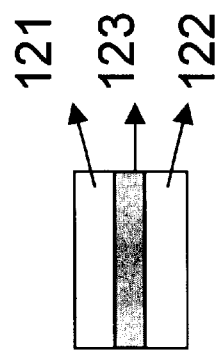
Figure 11(a):Compressive
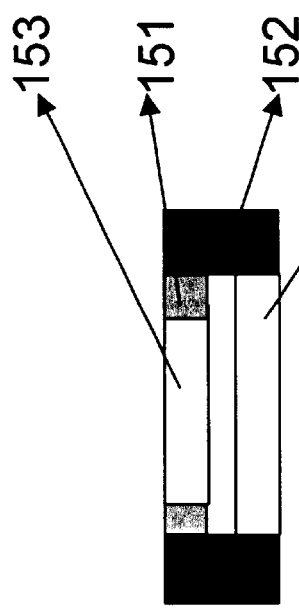
Figure 11(d):Shear

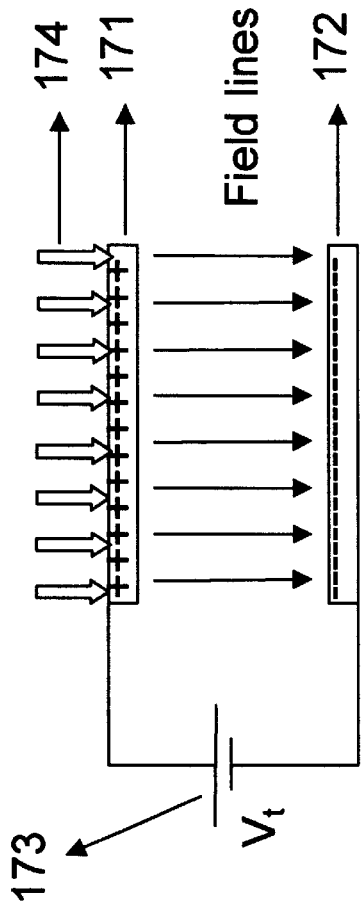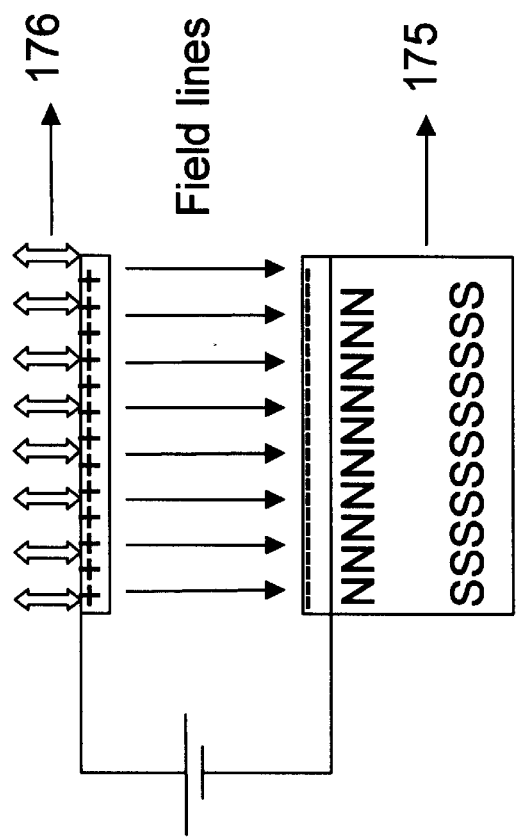
Figure 12a
Figure 12b
Fig 12

TUNABLE FABRY-PEROT INTERFEROMETER USING ENTROPIC MATERIALS

Priority is claimed based on U.S. Provisional Application Serial No. 60/190,110 entitled "Voltage Tunable Etalon Using Compliant Microelectromechanical System (MEMS) Technology" filed Mar. 20, 2000, U.S. Provisional Application Serial No. 60/209,992 entitled "Tunable Fabry-Perot Etalon with a Modified Elastomer Support Layer", filed Jun. 8, 2000, and U.S. Provisional Application Serial No. 60/213,480, entitled "A Tunable Fabry-Perot Interferometer With a Compliant Support Layer" filed Jun. 23, 2000, which are hereby incorporated by reference.

BACKGROUND OF THE INVENTION

1. Field of the Invention

This invention relates to a tunable Fabry-Perot Interferometer, which selectively filters a series of monochromatic wavelengths from an incident broadband radiation.

2. Description of the Related Art

Industry experts agree that the telecommunications industry is experiencing explosive growth and is one of today's fastest growing economic segments. With the tremendous growth of the Internet and the increase in telecommunications traffic, many telecom companies are rapidly deploying new network topologies and transport technologies such as WDM (wavelength-division-multiplexing) and DWDM (dense-wavelength division multiplexing) to increase the capacities of their networks. With the advent of fiber optic communications networks, the deployment of all-optical networks is clearly the ultimate goal for the next generation of telecommunications networks. A critical component to the successful deployment of the all-optical network is a tunable Fabry-Perot Interferometer, which selectively filters a series of monochromatic wavelengths from incident radiation.

As shown in FIG. 1, a Fabry-Perot interferometer 10 is a comparatively simple structure consisting of two plane parallel partial reflectors 12 and 14 (with reflectivity of ca. 90% or higher and with very low losses due to scattering and absorption) separated by a suitable transparent medium. The reflectors may be formed with a concave curvature to minimize losses caused by beam walk off. If the optical path length (distance multiplied by refractive index) between the two reflecting surfaces is an integral number of half wavelengths of the incident light, then the structure becomes optically resonant (i.e. the light at that wavelength is transmitted through the cavity). Other wavelengths not meeting the resonant condition are not transmitted. The wavelengths transmitted by the device are given by $$T_\lambda = \frac{I_{T,\lambda}}{I_{o,\lambda}} = \frac{1}{1 + F\sin^2\left(\frac{2\pi n d}{\lambda}\right)} \quad \text{Eqn. 1}$$

where $I_{T,\lambda}$ and $I_{o,\lambda}$ are the transmitted and incident light intensities at wavelength $\lambda$, respectively; n is the refractive index of the medium between the two parallel mirrors with separation d. The resonant wavelength can be manipulated (tuned) by changing either the refractive index (n) of the medium between the two mirrors, or the separation between them (d). F is a parameter related to the cavity Finesse, and is related to the mirror reflectivity~higher F represents narrower transmitted peaks.

The capacity of a WDM or DWDM network is directly proportional to the number of optical signals, or channels, it transports. The initial 400-GHz to 800-GHz 8-channel systems that were deployed in medium and long haul network applications have quickly evolved into conventional C-band 100-GHz systems that incorporate more than 40 channels, but these systems are already beginning to reach their maximum capacities. Many vendors are looking to deploy solutions that will allow a) higher density channel spacing, and b) operations in both the C-band (1530 nm–1563 nm) and the long L-band (1575 nm–1610 nm) simultaneously. These changes will provide the capability to transport up to 256 channels of optical data on a single fiber.

As shown in FIG. 2, a tunable Fabry-Perot interferometer with an initial optical path length of ca. 10 microns is characterized by a filter function 16 with a free spectral range (separation between two transmitted wavelengths) of ca. 125 nm in the C and L-band range. If the optical path length is changed by 1 µm, then the transmitted peaks move horizontally by ca. 100 nm~thereby scanning the C and the L bands. To provide the desired 256 channels, the filter function must exhibit a Finesse (FSR divided by the full width at half maximum) of at least ca. 200, preferably higher than 2000; and remain undistorted during tuning. As shown in FIG. 2, the transmitted peaks become narrower as the mirror reflectivity (denoted next to the four traces) increases. The two mirrors must have high reflectivity, low loss and low surface defects and they must be aligned to nearly zero tilt between them in the initial state. Further, this alignment state must be maintained as the optical path length between them is changed over the desired range (i.e. by ca. 1 µm). To achieve commercial success, the interferometer must also be cost effective, have low insertion losses, sufficiently rapid scan rates and remain thermally stable over a minimum ten year lifetime.

Currently the majority of commercially available scanning Fabry-Perot interferometers are based on a piezoelectric crystal technology. The movable mirror is mounted on a piezo electric material, which changes its dimensions in response to an applied voltage. Queensgate Instruments Limited produces a piezo controlled interferometer, early versions of which are described by T R Hicks, N K Reay and P D Atherton "The application of capacitance micrometry to the control of Fabry-Perot etalons" J. Physics E: Sci. Instrum., Vol. 17, 19844 and European patent publication EP702205A2 entitled "Interferometer" to T R Hicks. U.S. Pat. Nos. 4,400,058 and 4,553,816 also describe piezo electric interferometers. Piezo interferometers are complex, expensive, operate at high voltages, exhibit limited tuning ranges and have hysterisis and thermal drift problems.

Many attempts have been and are continuing to be made to apply classic silicon micromachining to solve the problems. In the silicon-MEMS based devices, electrodes are deposited onto both mirrors~thus an electrostatic force is created when a voltage is applied. The moveable mirror then moves against a semi-rigid silicon micromachined member, thereby changing the mirror separation. When the applied voltage is removed, the restoring force exerted by the semi-rigid member moves the moveable mirror back to its original configuration. U.S. Pat. No. 4,203,128 to Guckel; U.S. Pat. No. 4,825,262 to Mallinson; U.S. Pat. No. 4,859,060 to Katagiri; U.S. Pat. No. 5,561,523 to Blomberg; and U.S. Pat. No. 6,078,395 to: Jourdain;. PCT Application WO99/34484 to Tayebati and E. Ollier; P. Mottier "*Micro-Opto-Electro-Mechanical Systems: Recent developments and LETI's activities*" Proceedings of SPIE Vol. 4075, 2000 each describe variations on a silicon-MEMS based interferometer. These devices require complex processing techniques, which makes them expensive due to the high cost/low yield of precision lithography, exhibit a limited tuning range (ca. 40 nm) due to material properties of silicon, and have difficulty maintaining a repeatable filter function during repeated tuning over long periods of time.

An anomalous technology, described in U.S. Pat. No. 5,068,861 entitled Etalon Apparatus, depicts a pair of mirrors separated by a compressible body portion (elastic spacer member) actuated with a helical compression spring via the rotation of a load adjustment knob. In theory, the helical compression spring could be controlled to squeeze the compressible body portion to select a desired wavelength for static operation. Clearly the manual operation of the adjustment knob and mechanical actuation are not suitable for scanning applications required by the telecommunications industry.

Thus, existing tunable Fabry-Perot Interferometers cannot provide a cost effective solution with the required Finesse and tuning range.

SUMMARY OF THE INVENTION

In view of the above limitations, the present invention provides a cost-effective broadband tunable Fabry-Perot interferometer.

This is accomplished with a pair of mirrored surfaces separated by an initial optical path length corresponding to the desired free spectral range. One of the mirrors is fixed while the other moves against the restoring force exerted by a compliant support. Tunability is afforded by creating field lines that exert a force by, for example, electrostatic or magnetic means that deforms the compliant support. When the force is removed, the energy stored in the compliant support restores the mirror to the initial separation.

In accordance with the present invention, the compliant support is formed of an entropic, rather than an enthalpic material, with a variety of geometries including compression, tension, sheer and diaphragm. Entropic materials afford four key advantages over enthalpic materials pertaining to device response and positional/angular stability.

(1) Entropic materials (e.g. long chain homopolymers, block copolymers, elastomers, aerogels etc.) exhibit an entropic plateau region (characterized by an elastic modulus that is ca. 5 MPa or less, and is independent of frequency and strain level over a wide range of frequencies and strain levels. Enthalpic materials have an elastic modulus that is ca. 1 GPa or more, and is independent of frequency only for very small strain levels.

(2) Entropic materials have a much higher elastic limit (more than ca. 100% strain vs. less than ca. 1% strain for enthalpic materials) and thus avoid plastic deformation during actuation. This greatly enhances the achievable tuning range.

(3) Entropic materials are incompressible~the energy cost for volume deformation is nearly infinite, when compared to the energy cost for linear and shear deformation. This compares with enthalpic materials wherein the energy cost for volume and linear deformations are comparable. When angular misalignment requires volume deformation in the support layer, and tuning requires shear or linear deformation only, then the energy cost for angular misalignment becomes much higher than the energy cost for tuning with an entropic support layer material, thus the device becomes more stable. For enthalpic support layers, the two energy costs remain comparable, thereby contributing to device instability.

(4) Entropic materials display a normal stress behavior: when they are shear deformed, they exert a so called normal stress perpendicular to the direction of shearing, in addition to the shear stress directly resulting from the shear strain. This behavior can be used to further enhance stability with specific compliant support geometries. Enthalpic materials do not display this normal stress behavior, and thus cannot be designed for enhanced stability.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 6 is an illustration of a long chain entropic material and three deformation modes;

FIGS. 11a through 11d illustrate different compliant support geometries including compressive, tension, diaphragm and shear; and FIGS. 12a–12b illustrate, respectively, electrostatic and electromagnetic actuation mechanisms for use with any of the device geometries.

DETAILED DESCRIPTION OF THE INVENTION

The present invention provides a cost-effective solution for a scanning Fabry-Perot interferometer over a wide tuning range with a repeatable high Finesse filter function.

To achieve a wide tuning range, the compliant support must display linear-elastic behavior over a wide range of frequencies, and over the entire deformation range. The entropic material provides such behavior.

To achieve a repeatable high Finesse filter function, the compliant support must display positional and angular stability to hold the parallelism between the two mirrors to within a tight tolerance. The entropic material provides a very steep energy profile that enhances stability for a given device compliance. In other words, with the proper support configuration, the energy cost of misalignment becomes significant compared to the energy cost of deformation. By comparison, the energy cost for misalignment is negligible for enthalpic support layers, hence conventional devices are less stable than the present invention. The entropic material also provides a normal stress component, which can further enhance stability in certain support geometries.

To be cost effective (at least in the high volume markets), any solution must avoid expensive materials, avoid precision lithography with its high capital investment, provide high yields, limit the complexity of any external control circuitry and minimize recalibration requirements (manual or automatic). Because entropic materials exhibit much lower Young's modulus than enthalpic materials, the compliant support can be much thicker and generally less precise without sacrificing performance. The cost advantage provided by spin coating and curing entropic materials versus standard MEMS processes may be substantial. Furthermore, the linear response and enhanced stability should limit the need for external control and recalibration.

Linear-Elastic Behavior

Figure 1:
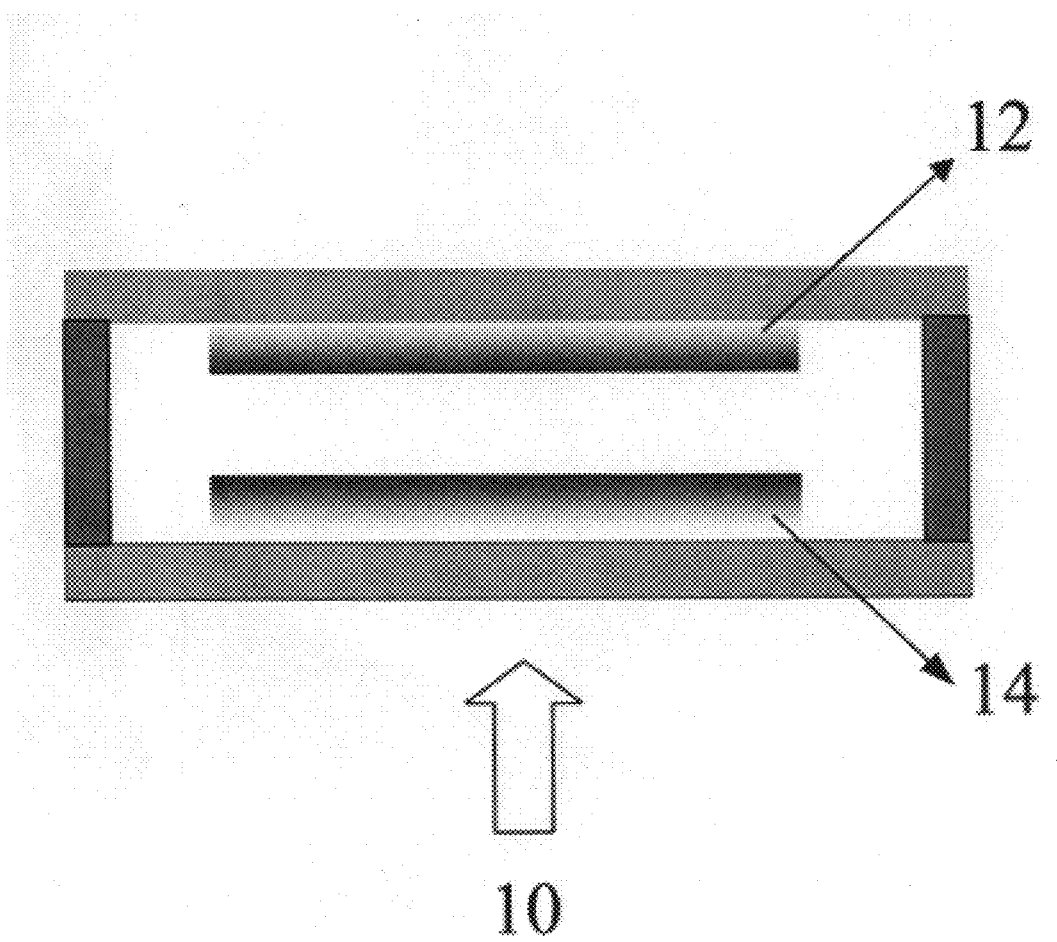
FIG. 1, as described above, is a schematic illustration of a tunable Fabry-Perot interferometer.
Figure 2:
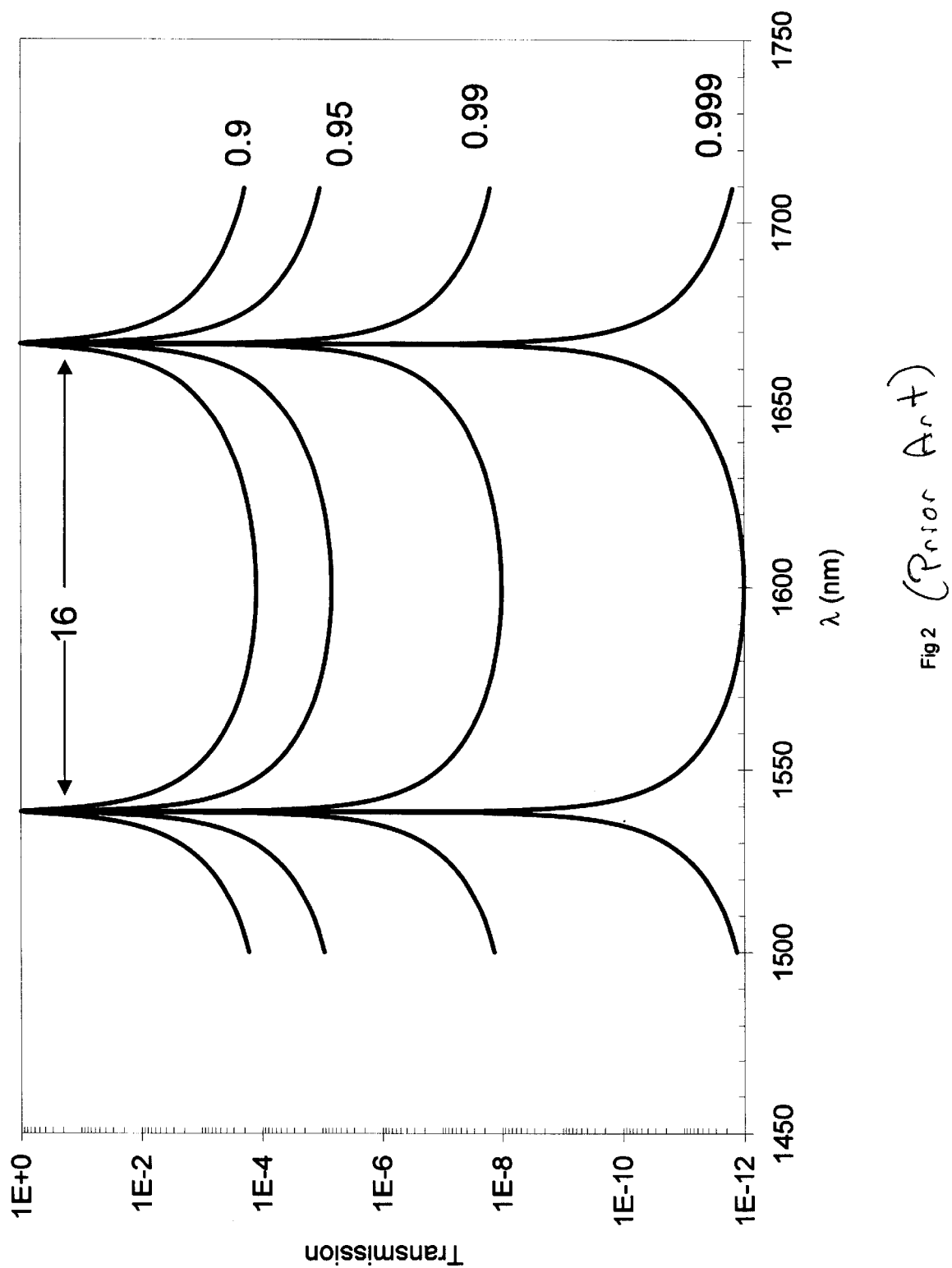
FIG. 2, as described above, illustrates a filter function from a Fabry-Perot interferometer for reflectivities of R=0.9, 0.95, 0.99 and 0.999.
Figure 3A:
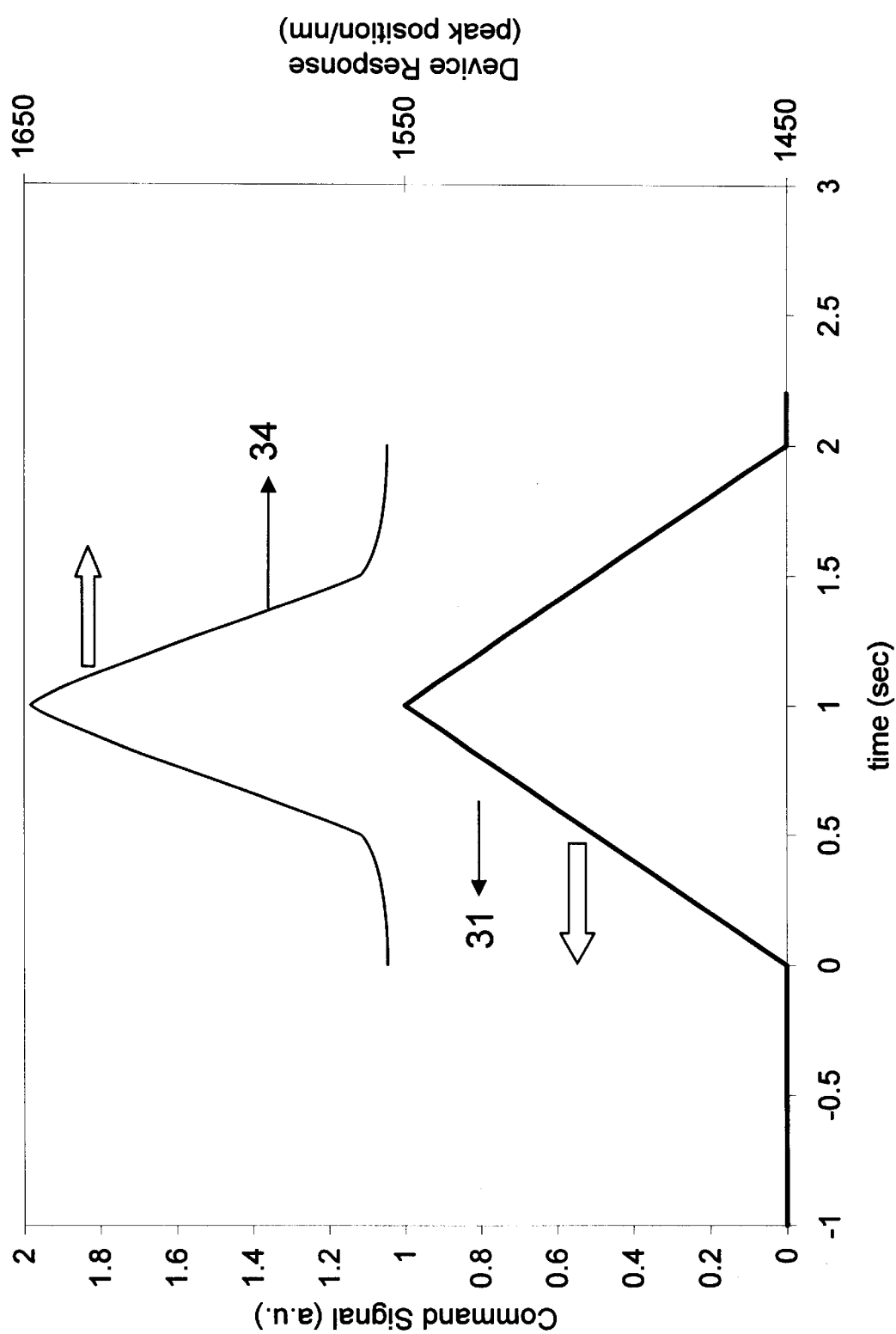
FIGS. 3a–3c are respectively, command signal, power spectrum and Young's modulus plots that together illustrate the required linear elastic property for the interferometer.
Figure 3B:
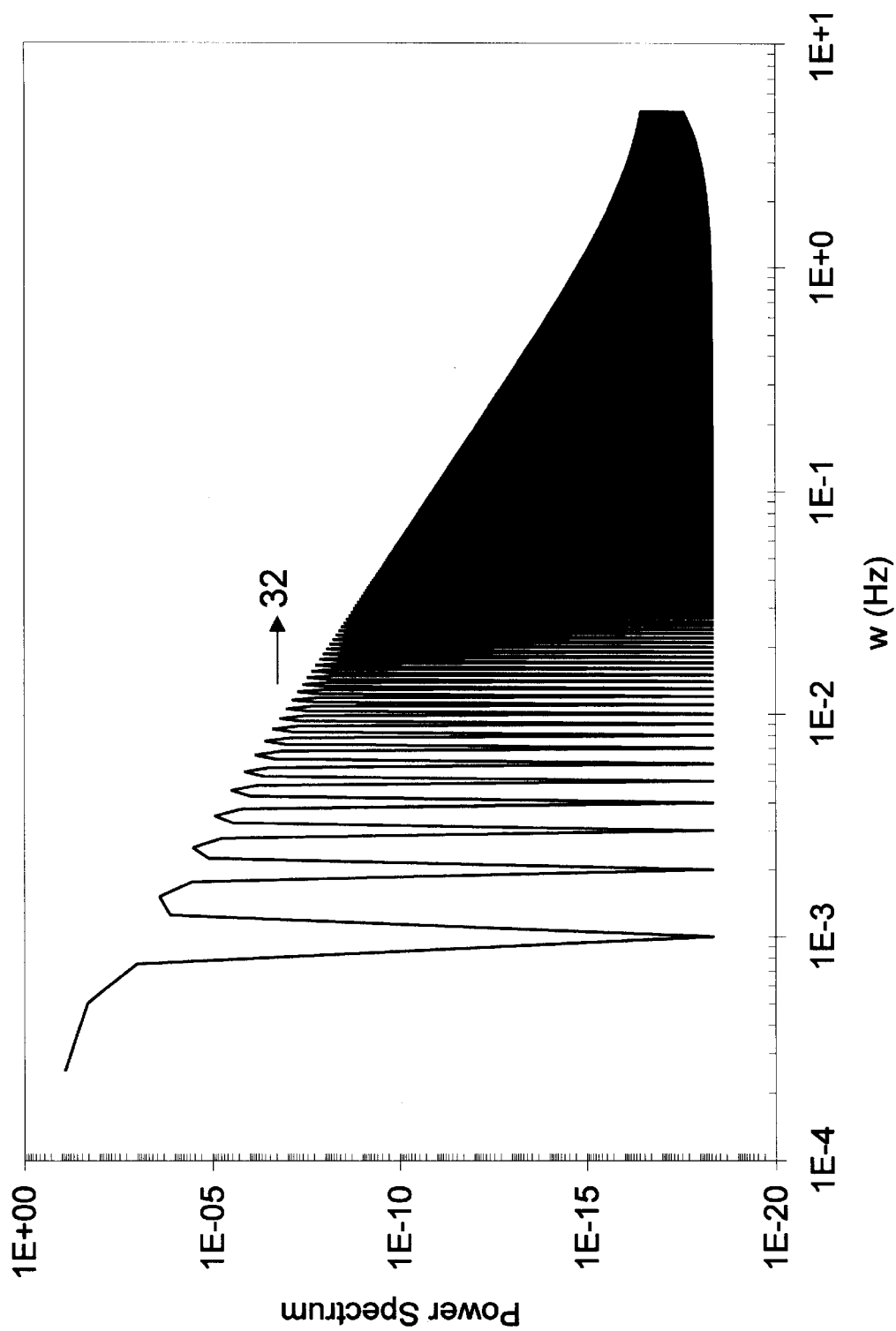
Figure 3C:
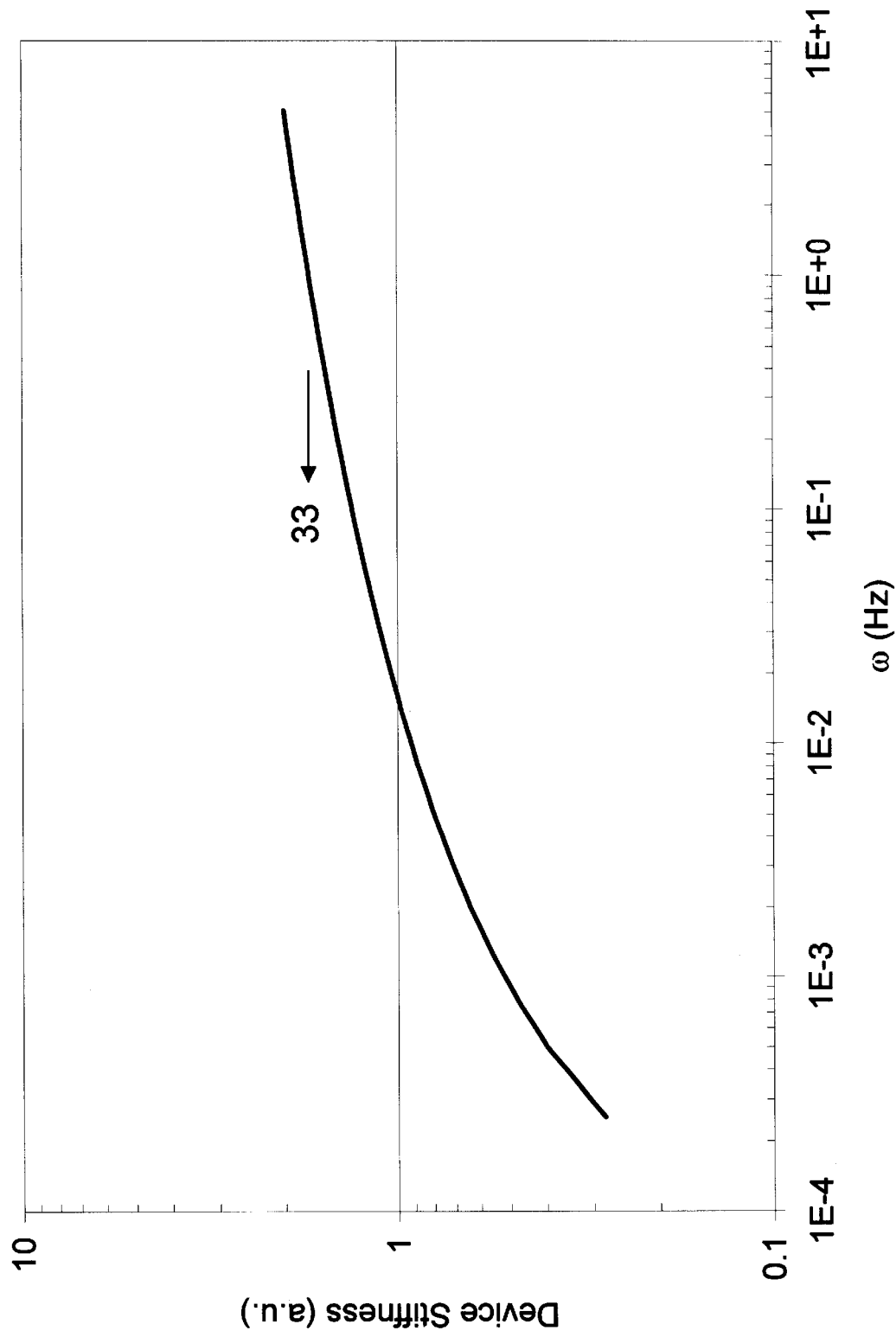

As discussed, the compliant support must display linear-elastic behavior over a wide range of frequencies, and over the entire deformation range. Failure to maintain a linear response can cause numerous problems including a wavelength offset, varying response to drive signals, instability that may deteriorate the filter function, need to include expensive electronic control and frequent recalibration. As depicted in FIGS. 3a–3c, a triangular command signal (31) has a power spectrum that is significant in magnitude over several decades in frequency (32). Neglecting viscous effects, the device is characterized by its stiffness. If the device stiffness (E) (33) changes with frequency, then the shape of the device response (34) significantly differs from the shape of the command signal. This relatively simple illustration (which ignores viscous effects) outlines the requirement for an elastic compliant material that is absent of any viscous effects. In other words, any change in the material's Young's modulus (either with deformation frequency/time scale, or with deformation strain level) will produce a non-linear response.

The Young's modulus can be associated with the energy cost of deforming the support layer. If the response is complex and time dependent, then the modulus is best described as either being time dependent $G_t$, or being frequency dependent, and comprising an elastic part ($G'_{107}$) and a viscous part ($G''_\omega$). The overall modulus originates from several modes, $$G_t = \sum_i g_i \cdot e^{(-t/\tau_i)} \qquad \text{eqn. 2a}$$

$$G'_\omega = \sum_i g_i \cdot \frac{(\omega\tau_i)^2}{1+(\omega\tau_i)^2} \qquad \text{eqn. 2b}$$

$$G''_\omega = \sum_i g_i \cdot \frac{(\omega\tau_i)}{1+(\omega\tau_i)^2}$$

In Equation 2, $g_i$ is the initial modulus contribution of the $i^{th}$ mode, and $\tau_i$ is the corresponding relaxation time. From a molecular viewpoint, examples of a mode include bond stretching, rotation, vibration, and bending.

Figure 4:
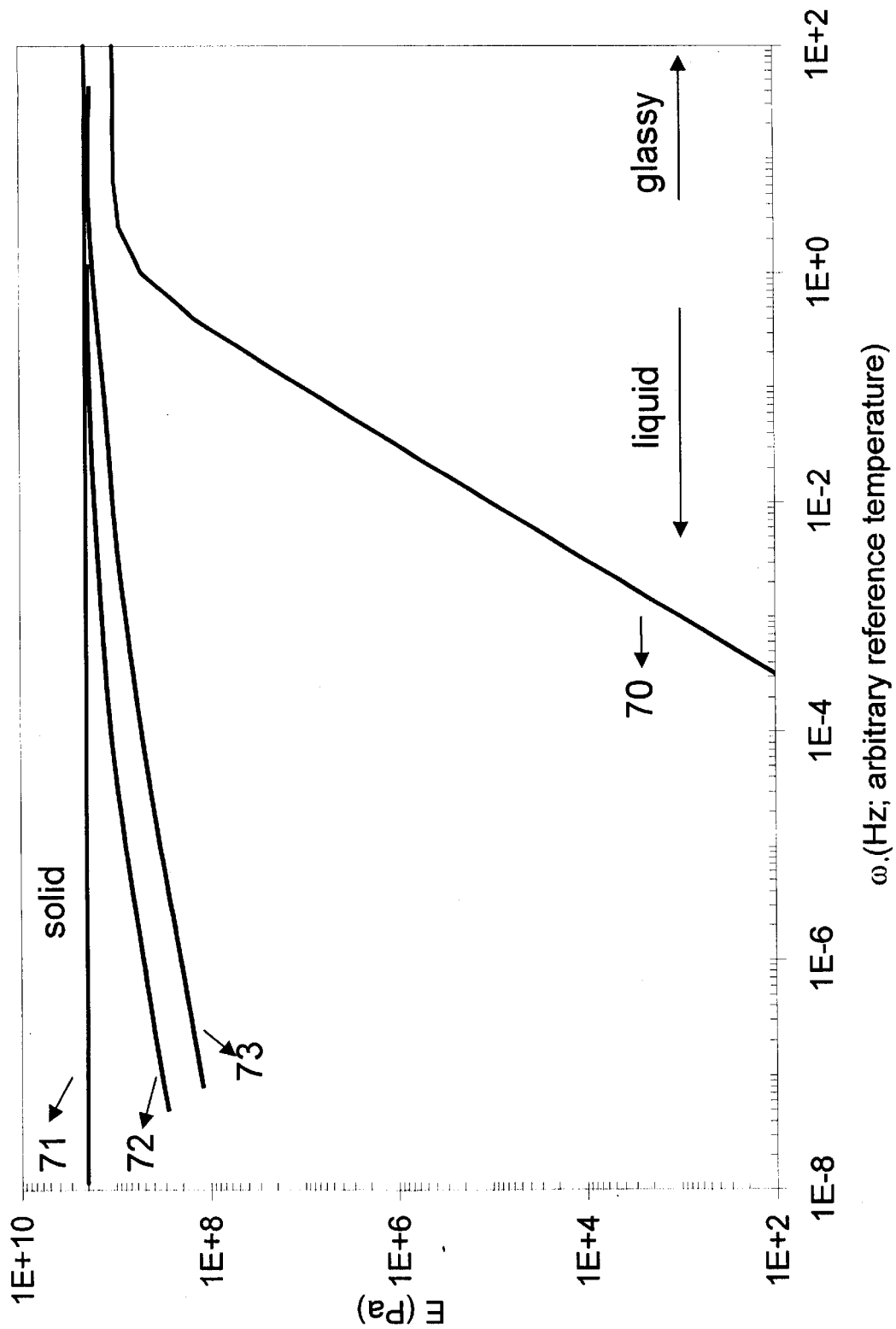
FIG. 4 is a log-log plot Young's modulus (E) versus frequency ($\omega$) for enthalpic materials.

As best shown in FIGS. 4–5, enthalpic materials such as crystalline silicon exhibit variable Young's modulus, hence non-linear behavior, for even the smallest deformations.

FIG. 4 summarizes the frequency dependent elastic modulus for crystalline solids and non-crystalline glasses and liquids. For non-crystalline materials 70, the modulus is ca. 1 GPa or higher above the dynamic glass transition, and decreases rapidly as the frequency decreases below the dynamic glass transition. Crystalline solids 71 do not display a dynamic glass transition, and the modulus is relatively independent of frequency for small strain levels. However, as the strain levels increase 72, 73, the modulus decreases with decreasing frequency. This behavior is generic to all enthalpic materials, and can be understood with a simplistic atomic model for the macroscopic modulus, as shown in FIG. 5.

Figure 5A:
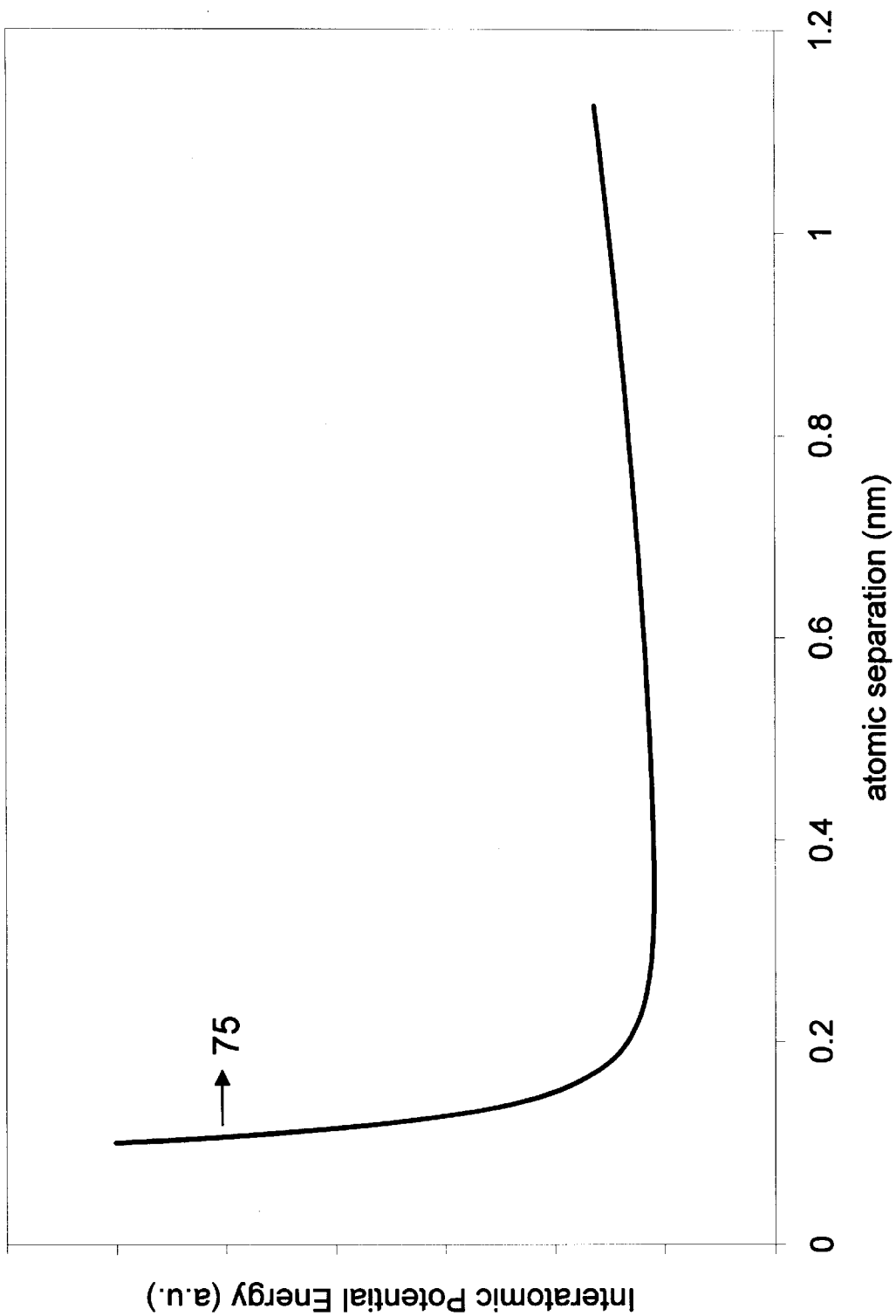
FIGS. 5a–5b are, respectively, plots of a representative interatomic potential for a two-atom system and the force-displacement curve felt by individual atoms.
Figure 5B:
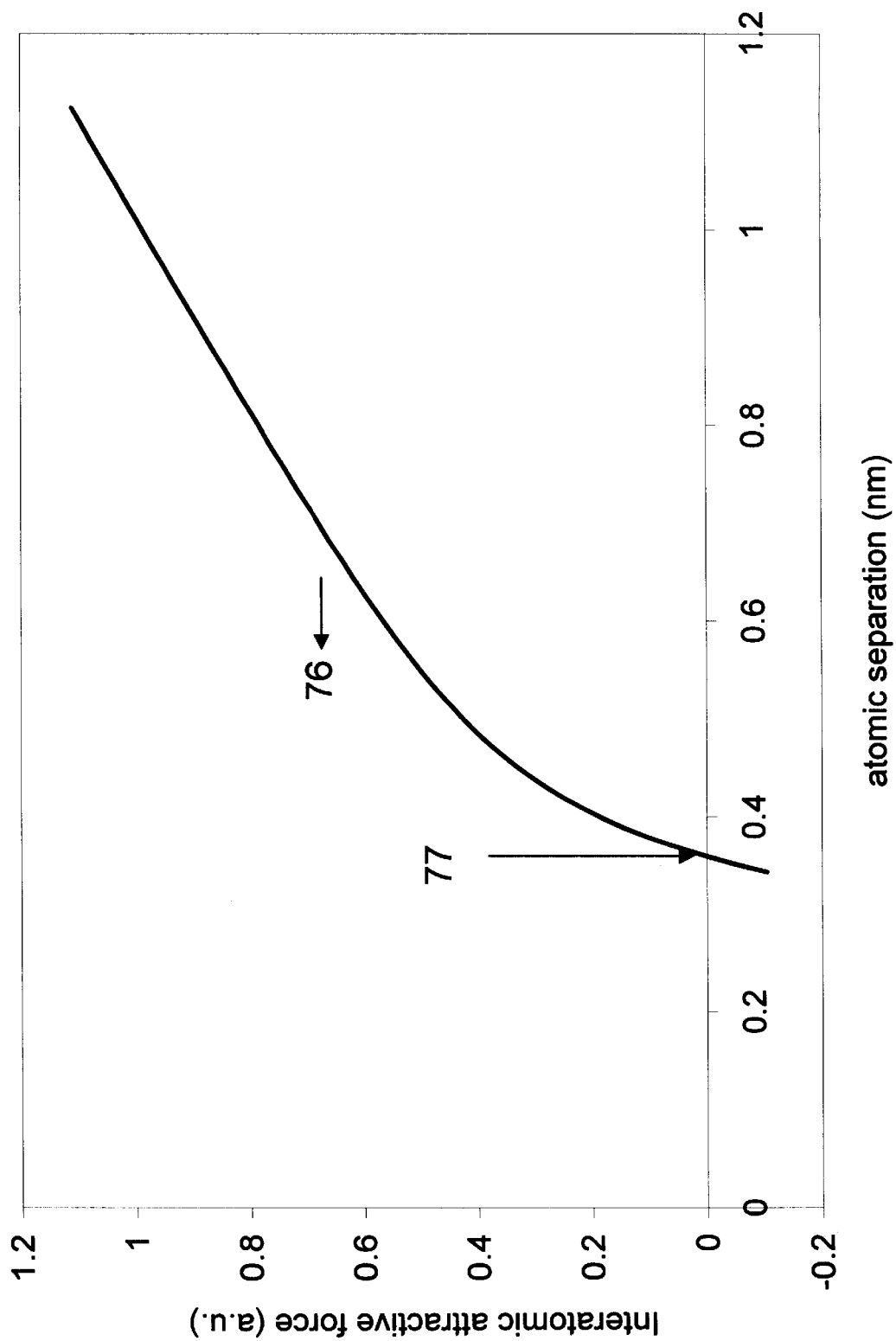

As shown in FIG. 5a, the interatomic potential 75 describes the potential energy of a two-atom system as a function of the distance between the two atoms. The two body interatomic potential can be used to illustrate the enthalpic modulus of crystalline and glassy materials. In the absence of external strain, the atoms rest in energy minimum positions; when an external strain is applied, the potential energy of the atom climbs up the interatomic potential. The force 76 felt by the atom is the slope of the interatomic potential, and is depicted in FIG. 5b. The atomic rest position 77 corresponds to the separation where the force is zero; as the atoms are pulled apart, the force increases, corresponding to the slope of the interatomic potential. Since the interatomic potential is non-linear with atomic, separation, the force becomes a function of atomic separation. The macroscopic enthalpic material comprises many such two-atom and many-atom subsystems, but the initial slope of all such subsystems is about the same, and corresponds to an overall modulus of ca. 1 GPa or more. Thus, with respect to Equation 2, the $g_i$ for all modes is ca. 1 GPa or more, and the overall modulus appears to be independent of deformation frequency.

While this simple model simplifies the molecular origin of mechanical behavior in enthalpic materials, it does illustrate the inherent non-linearity. It can be seen from FIG. 5b that the force felt by the atom is non-linear with the displacement of the atom from its rest position. The macroscopic modulus arises from many such two-body and many-body interatomic potentials, with the same generic features depicted in FIG. 5a. Thus, non-linearities in the force-displacement curves of individual atoms translate into non-linearities in the stress strain curve at macroscopic dimensions. Since the modulus is the slope of the stress-strain curve, the overall modulus becomes a function of strain levels. Further, the different two-atom and many-atom potentials are differently affected~the initial modulus of the different modes are now different. Thus, the macroscopic modulus also becomes frequency dependent.

In contrast to enthalpic materials, the energy cost for deformation in entropic materials does not originate in changes in the interatomic distances, but in available atomic configurations. The overall modulus of entropic materials can also be frequency independent (as discussed below), but at much lower values.

The entropic energy cost for deformation arises from the long chain nature of the material. FIG. 6 depicts a long polymeric strand 80 in which several atoms 82 along the backbone are covalently linked together. Under normal conditions (i.e. in the undistorted melt or dilute solution state), the mean square end-to-end distance of the strand is given by $$\langle r^2 \rangle = C_\infty n l^2 \left(\frac{1+\cos\theta}{1-\cos\theta}\right)\left(\frac{1+\langle\cos\phi\rangle}{1-\langle\cos\phi\rangle}\right) \qquad \text{eqn. 3}$$

In Equation 3, n is the number of backbone bonds in the chain, l is the length of one backbone bond, θ is the bond angle; and $C_\infty$ and Φ are two other factors. Equation 3 reduces to $\langle r^2\rangle \approx 7nl^2$ for most flexible polymer systems. If n is large (ca. 100 or more), then the root mean square end-to-end distance (ca. $(\sqrt{7n})l$) is small compared to the chain contour length (nl).

Thus, entropic materials are best described by random coils of long chains comprising several hundred backbone bonds. If the two ends are fixed, then the random coil can adopt several configurations within the two constrained end points. During deformation, the root mean square end-to-end distance is increased, but remains small compared to the chain contour length. Within this altered state, the chain can still adopt several possible configurations, but the number of available configurations decreases from the unaltered state. This decrease in the number of available configurations results in an increase in the entropic energy of the system~which corresponds to the energy cost of deformation. If n is large, then the root mean square end-to-end distance remains negligible compared to the contour length of the chain. Thus, the deformation process remains linear (stress is linear with strain) for large strain limits (ca. 100% or more)~it is only when the r.m.s. end-to-end distance becomes comparable to the contour length that the deformation process becomes non-linear. Further, since the entropic cost for deformation is negligible compared to the energy cost of bond deformation, the modulus of entropic materials is considerably lower than that of enthalpic materials (ca. less than 1 MPa compared to greater than 1 GPa).

The deformation process comprises several modes, the first few are depicted in FIG. 6. As can be seen from the Figure, the different deformation modes resemble the vibration modes of a guitar string, with the higher order modes corresponding to deformation at shorter length scales. Typically, the relaxation time of a mode increases with increasing mode length scale, and if the length scale of a mode is greater than ca. 100 backbone bonds, then the mode conforms to entropic elasticity (i.e. the enthalpic energy cost of deformation within that mode is negligible). Thus, if the chain is large enough (typically, at least 100 and preferably 200 or more backbone bonds), then the first few modes conform to entropic elasticity. Under these conditions, the modulus is dominated by the initial modulus of the first few modes, and becomes independent of dynamic frequency or time of experiment. Finally, the long chain polymer can be further reacted into different topologies (e.g. a crosslinked network as in an elastomer, which can be further modified into an aerogel by incorporating air bubbles).

Figure 7:
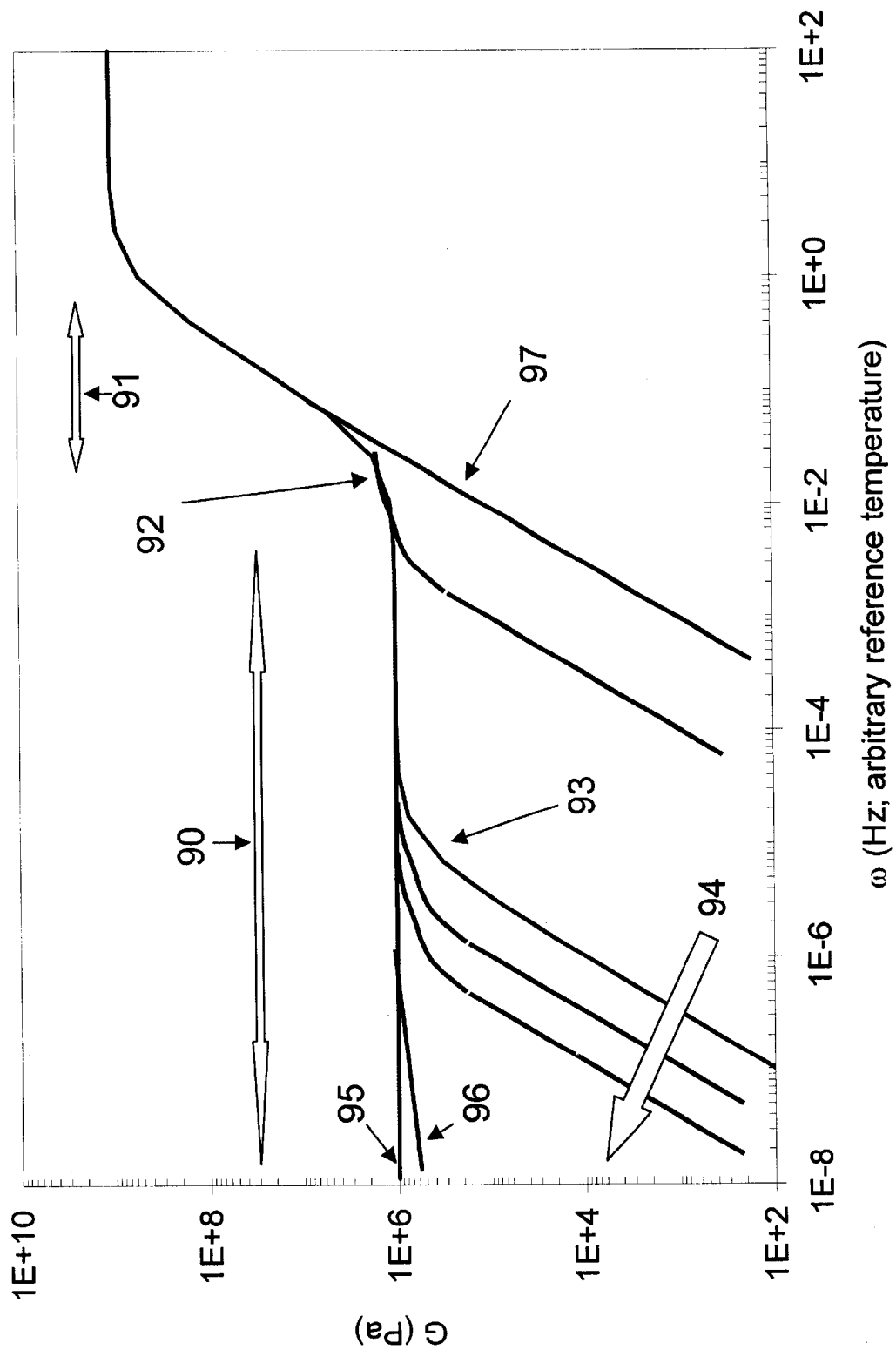
FIG. 7 is a log-log plot of modulus (G) versus frequency ($\omega$) for non-crystalline materials with various chain lengths.

Thus, ignoring viscous flow, entropic materials such as elastomers, aerogels or long chained polymers exhibit a broad entropic plateau region (90) below the dynamic glass transition 91 as shown in FIG. 7. The dynamic glass transition moves to higher frequencies as the temperature is raised. The entropic plateau region 90 extends over several frequency decades and an extremely wide range of deformation in which the Young's modulus is essentially constant. The essential device requirement is that the upper corner frequency 92 is at least one order of magnitude larger than the device scan rate (e.g. minimum 10 Hz for a 1 Hz scan rate), and the lower corner frequency 93 be at least one order of magnitude smaller than the recalibration frequency.

The upper corner frequency of the plateau region is the lower edge of the dynamic glass transition. Thus, it is affected by motions at local length scales (cooperative motions of ca. 20 or less backbone bonds), and is determined by local structure of the entropic material, not its overall length or topology. For polymers, the width of this plateau region increases with polymer chain length (since the length scale of the fundamental mode corresponds to the polymer chain length). The roll off in polymers is shifted to lower frequencies as the chain length increases (94). Elastomeric materials remain flat and never roll-off (95) because the effective length scale (and the relaxation time) of the fundamental mode is infinite. Aerogels (96) will roll-off at very low frequencies corresponding to the length scale of the entrapped air bubbles.

Volume Deformation & Viscous Flow in Compliant Elastomers

Entropic materials are incompressible, with a near infinite bulk modulus. This comes about because the Poisson's ratio (ν) is ca. 0.5. The Bulk modulus K, and the elastic modulus (E) are related by K=E/(1−2ν).

Thus, in entropic materials, the Bulk modulus is nearly infinite, even though the Elastic modulus is ca. 0.1 to 1 MPa. This compares to the situation in solids and glasses wherein the Poisson's ratio is ca. 0.33, and the bulk modulus K is ca. 3 times greater than the elastic modulus. From a molecular viewpoint, the infinite bulk modulus implies a near infinite energy cost for isothermal volume changes in the entropic material. This compares with solids and glasses wherein the energy cost for volume and linear deformations are comparable.

Thus, a flow process that transports material in and out of the volume element must accompany volume deformation in entropic materials. In perfect elastomers, the viscosity associated with this flow process is nearly infinite. This creates complications in the deformation process if the support layer is designed incorrectly. Consider the deformation of an elastomer layer 100 sandwiched between two hard surfaces 102, 104, depicted in FIG. 8a. While the figure depicts compressive deformation, the same scaling behavior applies to tensile deformation as well.

Figure 8:
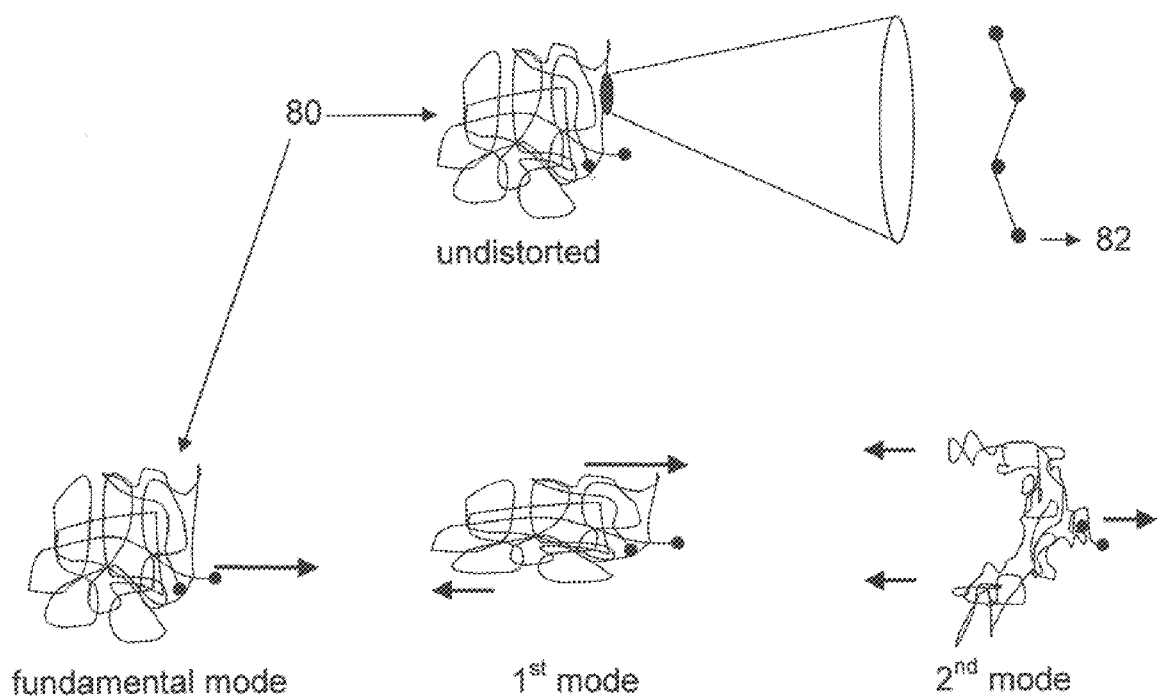
FIGS. 8a–8b are, respectively, perspective and section views illustrating compressive deformation of an elastomeric layer.

Since the volume of the elastomer layer cannot change, a flow process, as shown in FIG. 8b must accompany the deformation process.

The force required for flow is given by $$\eta \frac{V}{d} L^2$$

Where η is the viscosity associated with the flow process, V is a characteristic velocity associated with the flow, d is the thickness of the elastomer layer, and L is the lateral dimension.

To a first approximation, this force is associated with a pressure gradient between the center and the edges of the elastomer layer. Thus $$\eta \frac{V}{d} L^2 \approx [P_{\max} - P_o] L \cdot d$$

Hence, the characteristic velocity associated with flow is given by $$\bar{V} \approx \frac{[P_{max} - P_o] \cdot d^2}{\eta \cdot L}$$

And the response time, which is the time required to displace a desired volume, becomes $$\tau_R = \frac{\Delta V}{\bar{V} L d} = \frac{\Delta d L^2}{\bar{V} L d} \approx \frac{\Delta d L^2}{\frac{[P_{max} - P_o] d^2}{\eta L} L d} \qquad \text{eqn. 4}$$

$$\tau_R \approx \frac{\Delta d \eta L^2}{[P_{max} - P_o] d^3}$$

Equation 4 is an approximation that only serves to illustrate the general scaling behavior. With this approximation, it can be seen that the response time varies with the viscosity, the square of the elastomer lateral dimension, and the inverse of the $3^{rd}$ power of the elastomer thickness. Typically, perfect elastomers are associated with an infinite viscosity ($\eta = \infty$). Thus, the response time will always be infinite for a perfect elastomeric network. However, the viscosity in real elastomers is a finite number, because the degree of crosslinking is always less than 100% (>90% being considered "fully crosslinked"). Incorporating network defects and/or small dopant molecules within the elastomer and/or modifying the network itself to facilitate flow can further lower the viscosity. The network can be modified by, for instance, swelling the elastomer network with dopant molecules (e.g. toluene will swell a silicone based elastomer). This lowering of the viscosity enables devices in which the entropic support layer is compressed for the moveable mirror motion.

If the support layer thickness is of the order of 10 μm, then the response time for 10% volume deformation becomes significant (ca. 10–30 seconds assuming no additional dopant atoms). This situation corresponds to a device wherein the support layer is sandwiched between two mirrors spaced 10 μm apart. On the other hand, if the support layer thickness is ca. 100 μm, then the response time becomes 100 times smaller (0.1 to 0.3 seconds), following the scaling behavior summarized in Equation 4. Thus, if the entropic material is outside the etalon cavity, and if the motion of the moveable mirror is accompanied by tensile volume deformation of the support layer, then the device becomes viable from the viscous response time standpoint.

From a molecular viewpoint, the viscosity is associated with center of mass motions (i.e. the fundamental mode depicted in FIG. 6) of small(er) unreacted polymer strands in the elastomer and other dopant molecules of finite molecular weight. These smaller molecules flow in the matrix of the elastomer network (strands of the network cannot undergo center of mass motion). Considering the small dopant molecules separately, their center of mass motion is characterized by the corresponding modulus falling rapidly below 1 MPa as shown in FIG. 7. The characteristic frequency of center of mass motion decreases as the chain length increases. This frequency (97) can be very high if the chain length is very small, and the chain length should be small enough, such that the effective time constant for dopant molecule motion is at least 10 times smaller than the tuning time constant. This time constant follows from the inherent viscosity of the dopant molecules, and the size of the molecular channels through which they must flow. Under these conditions, both the tensile and the compressive devices become viable.

However, the flow process remains a dissipative energy loss mechanism~the energy required for flow is lost from the system, and must be minimized in comparison to the energy associated with elastomer deformation. If the total energy associated with device operation is dominated by the dissipative term, then the device response becomes time dependent (i.e. the device response becomes dependent on its loading history), and the dissipated energy also serves to reduce the device lifetime.

This issue of the incompressibility of the support layer is best addressed by designing the device such that the tuning operation does not require any volume change in the entropic support layer. For instance, if the motion of the moveable mirror requires shear deformation of the entropic support layer, then there is no volume change requirement on the support layer. In a diaphragm type device, mirror motion requires a tensile/compressive loading on the support layer. Under these conditions, the net volume change is small, and the length scale over which the volume must change (across the thin diaphragm layer) is also small~viscous flow effects become negligible for these devices as well. In these cases, the material's response time is determined by the elastic plateau behavior of the entropic support layer only.

Positional and Angular Stability

Figure 9:
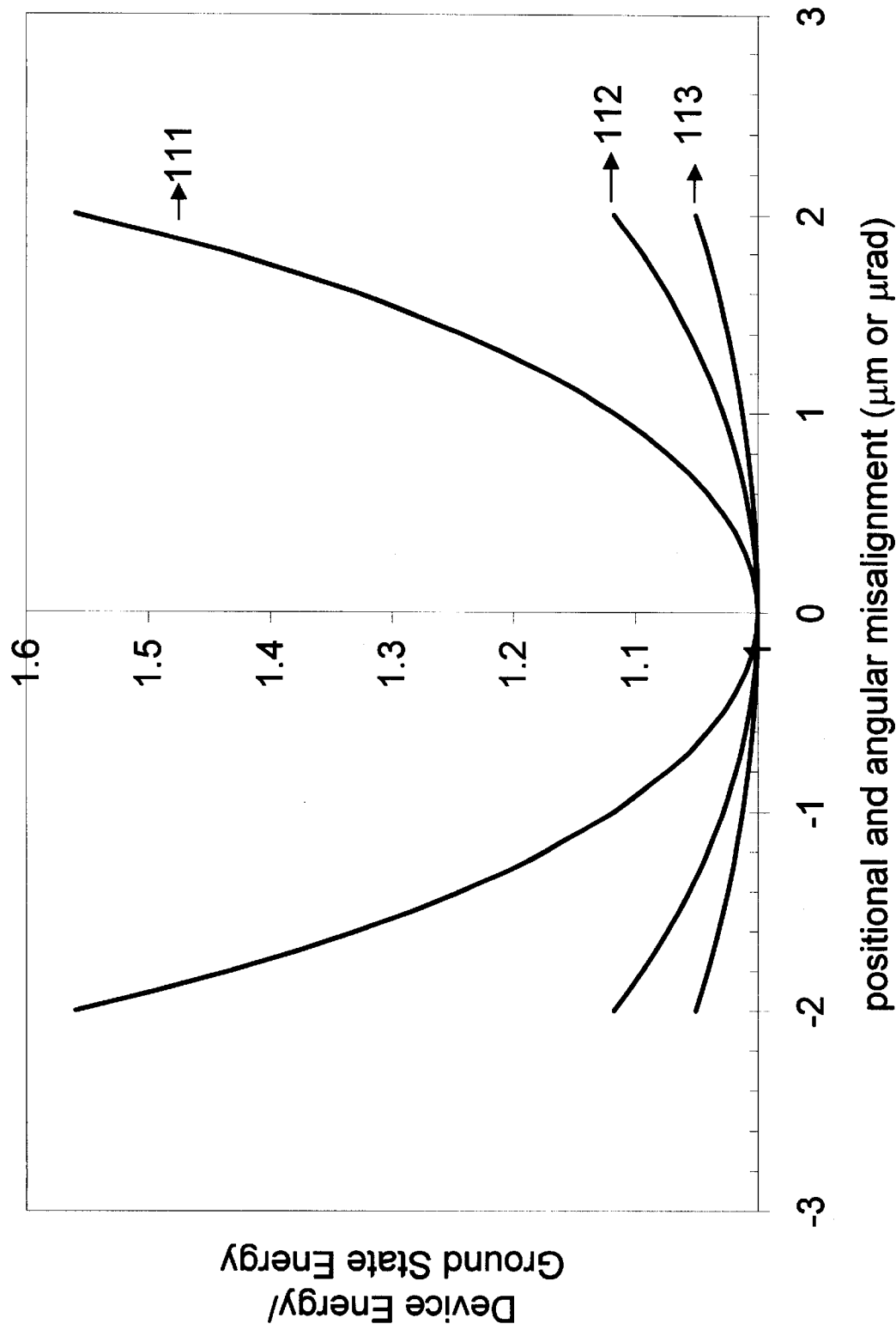
FIG. 9 is an energy profile of a device illustrating the increase in device energy for positional and angular misalignment.

As discussed, the compliant support, hence the movable mirror, must both be positionally and angularly stable to provide a repeatable high finesse filter function. This is best illustrated by the energy profiles depicted in FIG. 9. A stable device results when the potential energy of the device increases sharply with any deviation from the desired angle and position: devices in which this potential energy increase is minimal will be unstable. The energy content of the device is approximately proportional to kT (k is the Boltzmann's constant, and T is the absolute temperature). Thus, the angle and position of the moveable mirror will explore the configuration space wherein the increase in device energy is proportional to kT. The corresponding misalignment and positional inaccuracy must be within the specifications discussed previously. Thus, the steeper energy profile 111 is preferred over the shallower energy profiles 112 and 113.

Figure 10B:
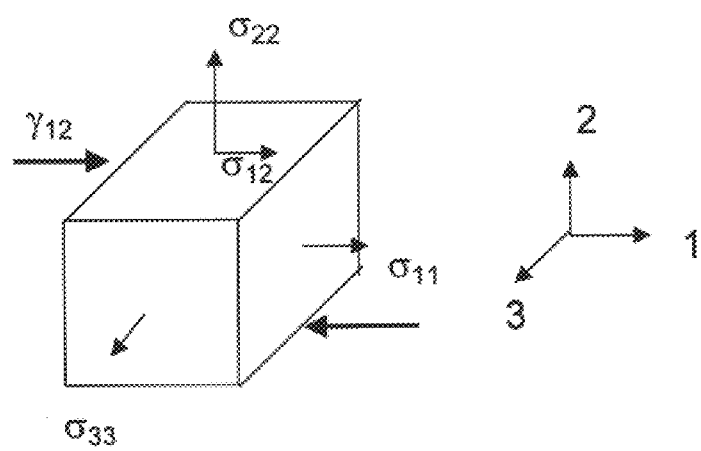
FIGS. 10a–10b are, respectively, illustrations of the increase in the restoring normal stress if a shear type device is subject to angular misalignment and the normal stress ($\sigma_{nn}$) acting on a unit volume element of an entropic material subjected to shear deformation ($\gamma_{12}$)
Figure 10A:
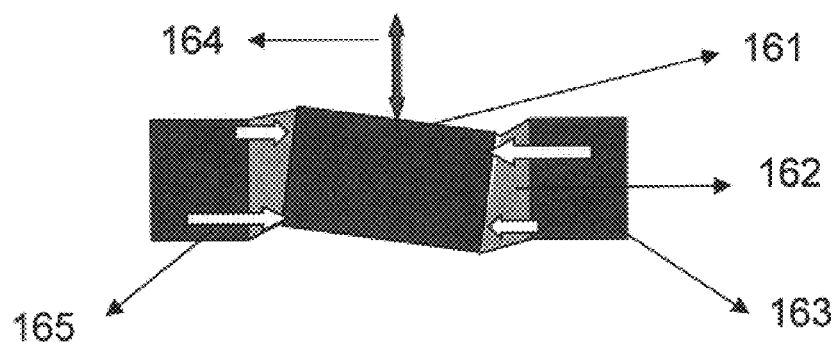

Entropic materials can afford better angular stability as best illustrated by considering a shear type device illustrated in FIG. 10a wherein the moveable mirror moves against a shear stress exerted by the support layer. Deviations from the desired angular position is accompanied by an energy cost of distorting the support layer~this energy cost includes the energy for volume deformation in the support layer 162. For enthalpic support layers, the energy cost for shear and bulk deformations are comparable: thus, the energy costs for angular misalignment and mirror motion are comparable. For entropic support layer, the bulk modulus is several orders of magnitude greater than the shear modulus: thus the energy cost for misalignment is much greater (at least an order of magnitude) than the energy cost for mirror motion. Thus, with the right design of the support layer (i.e. when the energy cost of mirror motion is not associated with a volume change, but angular misalignment is associated with a volume change), entropic materials afford more angular stability than enthalpic materials. Conversely, if the support layer is designed incorrectly (i.e. when the energy cost of mirror motion includes the energy cost for volume deformation), then the incompressibility of the entropic layer becomes a significant disadvantage.

Taking advantage of entropic materials' normal stress behavior can further enhance stability. To achieve this benefit, the compliant support must be configured such that the entropic material undergoes sheer deformation. As shown in FIG. 10b, when a unit volume of such a material is subjected to shear deformation ($\gamma_{12}$), it displays normal stresses ($\sigma_{11}$, $\sigma_{22}$, and $\sigma_{33}$) acting perpendicular to the three orthogonal unit planes. These normal stresses are in addition to the shear stress ($\sigma_{12}$) displayed by all materials, and are a consequence of the long chain nature of the entropic material (i.e. the causality of the normal stress behavior is identical to the causality of the entropic elastic behavior). Further, the magnitude of the normal stress is proportional to the square of the shear strain, which compares to the shear stress being directly proportional to the shear strain. This feature can be used to further enhance device stability, as explained below.

Consider a tunable interferometer wherein the moveable mirror 161 is supported by a shear type entropic support layer 162 to a rigid frame 163. If the mirror is misaligned, then one side of the shear sandwich must undergo compressive volume deformation and the other side must undergo tensile volume deformation~this process has an energy penalty as discussed previously. In addition, the shear strain of the support layer during motion is given by the vertical motion 164 of the mirror divided by the support layer thickness: thinner sides of the support layer are subjected to greater shear strains than thicker sides). Thus, the normal stress 165 acting on the mirror from the thinner side is greater than the normal stress acting on it from the thicker side~this force imbalance creates a restoring torque on the mirror. Finally, since the magnitude of the normal stress increases with the square of the shear strain rate, the magnitude of the restoring torque increases rapidly, as the mirror is misaligned.

Cost Effective Solution

As discussed above the solution must also be cost effective. A tunable Fabry-Perot interferometer that uses entropic materials reduces costs by reducing the capital investment in manufacturing, improving yield and reducing the external control needed to operate the device. First, entropic materials can be spun on, cured and, if necessary, patterned without the time consuming and very expensive deposition and precision lithography associated with conventional micromachining. Second, because the Young's modulus is orders of magnitude lower than enthalpic materials, the compliant support can be much thicker and relatively less precise for the same overall device performance tolerance~this in turn, also improves yield. Lastly, the improved device stability reduces the demands on external controls or feedback.

Tunable Fabry-Perot Interferometer Embodiments

The use of entropic materials also greatly enhances the design space available for configuring a tunable Fabry-Perot interferometer and, more specifically, the compliant support. As shown in FIGS. 11a–11d, the compliant support can be configured to undergo compressive, tensile, tensile/compressive, or shear deformation.

As shown in FIG. 11a, two partially reflecting mirrors 121, 122 are separated by an entropic material 123 such as an elastomer. The application of a command signal creates field lines (electrostatic or electromagnetic) that apply a force to move the movable mirror towards the fixed mirror thereby selecting different wavelengths. This embodiment is similar to the mechanically adjustable etalon described in the '861 patent and appears to be the least viable configuration for a scanning mode device because of the incompressibility of the entropic material and the viscous flow and dissipative energy losses discussed in detail above. This is irrelevant in the '861 implementation where mechanical control is used to tune and fix the wavelength but is critical in a computer controlled, automated scanning mode device.

As mentioned previously, the incorporation of defects in the elastomer network and/or small dopant molecules can significantly lower the viscosity. In addition, the entropic network itself can be modified (e.g. by swelling the network) to facilitate the flow of the dopant molecules. As a result, the device response time can be reduced to a point where scanning operation is possible. Another option is to use aerogels, which are characterized by very small air bubbles in the material. These bubbles are compressible, which minimizes the viscous flow requirement and reduces the device time constant.

As shown in FIG. 11b, the flow problem can also be overcome by moving the entropic material outside the interferometer cavity and operating in a tensile mode (the electrostatic or electromagnetic force pulls downward on the movable mirror thereby stretching the entropic material). More specifically, a thick entropic support layer 131 is formed on the rigid support 132 to hold the movable mirror 133 parallel to the fixed mirror 134 in order to form the interferometer cavity 135. In this case, the layer thickness can be significantly greater than the thickness of the interferometer cavity, and the time constants for the flow process become significantly smaller than the device scan rate. Thus, the elastomer becomes easy to deform and can operate in a scanning mode.

The compliant support for the movable mirror can be arranged in a diaphragm type layer undergoing tension/compression deformation (FIG. 11c) or in a shear sandwich between two rigid plates undergoing shear deformation (FIG. 11d). These deformation modes involve either no or negligible volume change, hence do not require a net flow process. Therefore, the time constants for these deformation processes are very fast and the energy cost of misalignment is very high.

A shear vs. diaphragm device is differentiated only in the aspect ratio (i.e. the ratio of the height and lateral width) of the elastomer. When the elastomer layer resembles a sheet of paper, e.g. an aspect ratio less than 1, undergoing deformation lateral to the plane of the paper, then tensile/compressive forces accompany the deformation and the device is said to be in diaphragm mode. More specifically, entropic diaphragm 141 is mounted on support 142 to hold movable mirror 143 parallel to fixed mirror 144. When the elastomer layer has an aspect ratio greater than 10, the device is said to be in shear mode. More specifically, the moveable mirror 153 is supported by an entropic sleeve 151 mounted on a rigid support 152 and held parallel to a fixed mirror 154. Both these modes afford good elastic processes. Note, the diaphragm is on the order of 100 $\mu$m thick, which is 10 times thicker than conventional micromachined devices. The shear device also affords the additional stabilizing mechanisms described above.

In each case, an actuating force must be applied to the compliant support to cause the device's filter function to selectively scan the wavelengths across the range within a prescribed period, e.g. 1 second or less. Mechanical (manual) actuation of the type described in the '861 patent is inappropriate because the requirement is for repeated scanning with very high accuracy. The present invention contemplates using either electrostatic or electromagnetic actuation to create field lines that produce the actuating force.

As shown in FIG. 12a, an electrostatic actuator is created by depositing two electrodes 171,172 on the mirror surfaces (e.g. a 50 nm thick silver layer) outside the optical path, and connecting them to a controllable voltage source 173. The command signal ($V_t$) is applied between the two electrodes, resulting in field lines that produce an attractive stress 174 between them. As shown in FIG. 12b, the magnetic actuator differs from the electrostatic actuator in that a magnetic material is deposited or placed on the movable mirror and a magnetic field generated by a coil on or near the fixed mirror produces a force that can be either attractive, or repulsive. Multiple different configurations are contemplated to actuate the movable mirror. For example, optically transparent electrodes could extend across the mirror surfaces through the optical path. In addition, one of the electrodes could be affixed to a structure other than the fixed mirror outside the optical cavity. This may provide more freedom in the engineering space to separately optimize the optical cavity and actuation mechanism.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A tunable Fabry-Perot interferometer, comprising:
   a fixed partially reflective mirror;
   a movable partially reflective mirror disposed parallel to the fixed mirror;
   a compliant support that supports the movable mirror so as to permit variable dimensioning of an optical Fabry-Perot interferometer cavity formed between the fixed and movable mirrors, said compliant support being formed of a material that exhibits an entropic plateau region; and
   an actuator for creating field lines that apply a force to said movable mirror that deforms the compliant support and controls said variable dimensioning as a function of an electric command signal.

2. The tunable Fabry-Perot interferometer of claim 1, wherein the material comprises long chain polymers with at least 100 bonds per chain that are fully crosslinked at at least 90% of the bonds.

3. The tunable Fabry-Perot interferometer of claim 2, wherein the material is selected from one of an elastomer, aerogel or long chain polymer.

4. The tunable Fabry-Perot interferometer of claim 1, wherein the material exhibits a Young's modulus less than 5 MPa in the entropic plateau region.

5. The tunable Fabry-Perot interferometer of claim 1, wherein said variable dimensioning scans a filter function across a range of wavelengths at a scan rate, the entropic plateau region extending over multiple frequency decade with an upper corner frequency at least one order of magnitude greater than the scan rate.

6. The tunable Fabry-Perot interferometer of claim 1, wherein said variable dimensioning deforms the compliant support over a deformation range, the material, hence the compliant support exhibiting a linear elastic behavior over the entire deformation range.

7. The tunable Fabry-Perot interferometer of claim 1, wherein the material is incompressible and the compliant support undergoes no volume change during deformation, said material exhibiting an energy cost of misalignment of the movable mirror that is at least an order of magnitude greater than the energy cost of deformation thereby self-stabilizing the movable mirror.

8. The tunable Fabry-Perot interferometer of claim 1, wherein the material undergoes sheer deformation, said material exhibiting a normal stress that provides a force on the movable mirror perpendicular to the direction of motion thereby further self-stabilizing the movable mirror.

9. The tunable Fabry-Perot interferometer of claim 1, wherein said variable dimensioning scans a filter function across a range of wavelengths with a time constant $t_{scan}$, said material undergoes a volume change during deformation that causes a viscous flow with a time constant $t_{response}$ that is at least one order of magnitude less than $t_{scan}$.

10. The tunable Fabry-Perot interferometer of claim 9, wherein the material lies inside the interferometer cavity and undergoes compressive stress during deformation, said material being doped with small molecules to reduce its viscosity such that $t_{response}$ is at least one order of magnitude less than $t_{scan}$.

11. The tunable Fabry-Perot interferometer of claim 9, wherein the material lies inside the interferometer cavity and undergoes compressive stress during deformation, said material network is modified to reduce its viscosity such that $t_{response}$ is at least one order of magnitude less than $t_{scan}$.

12. The tunable Fabry-Perot interferometer of claim 9, wherein the material lies outside the interferometer cavity on the movable mirror and undergoes tensile stress during deformation, said material having a thickness greater than the separation between said fixed and movable mirrors such that tresponse is at least one order of magnitude less than tscan.

13. The tunable Fabry-Perot interferometer of claim 1, wherein the compliant support and the material lie outside the interferometer cavity.

14. The tunable Fabry-Perot interferometer of claim 1, wherein the compliant support forms a diaphragm that supports said movable mirror and undergoes tensile/compressive deformation response to said variable dimensioning.

15. The tunable Fabry-Perot interferometer of claim 14, wherein the diaphragm has an aspect ratio less than 1.

16. The tunable Fabry-Perot interferometer of claim 1, wherein the compliant support forms a sleeve that supports the movable mirror and undergoes sheer deformation in response to the variable dimensioning.

17. The tunable Fabry-Perot interferometer of claim 16, wherein the sleeve has an aspect ratio greater than 10.

18. The tunable Fabry-Perot interferometer of claim 16, wherein the material undergoes no volume change during sheer deformation such that the energy cost of misalignment of the movable mirror is at least an order of magnitude greater than the energy cost of deformation thereby self-stabilizing the movable mirror.

19. The tunable Fabry-Perot interferometer of claim 16, wherein the material exhibits a normal stress that provides a force on the movable mirror perpendicular to the direction of motion thereby further self-stabilizing the movable mirror.

20. The tunable Fabry-Perot interferometer of claim 1, wherein the actuator is an electrostatic actuator that creates electric field lines to produce the force on the movable mirror.

21. The tunable Fabry-Perot interferometer of claim 1, wherein the actuator is an electromagnetic actuator that creates magnetic field lines to produce the force on the movable mirror.

22. A tunable Fabry-Perot interferometer, comprising:

a fixed partially reflective mirror;

a movable partially reflective mirror disposed parallel to the fixed mirror;

a compliant support that supports the movable mirror so as to permit variable dimensioning of an optical Fabry-Perot interferometer cavity formed between the fixed and movable mirrors; and an actuator that applies a force to said movable mirror that deforms the compliant support over a deformation range to control said variable dimensioning thereby scanning a filter function formed by the interferometer cavity across a desired range of wavelengths, said compliant support being formed of a material that exhibits a Young's modulus of less than 5 MPa across an entropic plateau region that extends over multiple frequency decades including an upper corner frequency at least one order of magnitude above the scan rate and exhibits linear elastic behavior over the entire deformation range.

23. The tunable Fabry-Perot interferometer of claim 22, wherein the material comprises long chain polymers with at least 100 bonds per chain that are fully crosslinked at least 90% of the bonds.

24. The tunable Fabry-Perot interferometer of claim 22, wherein the material is selected from one of an elastomer, aerogel or long chain polymer.

25. The tunable Fabry-Perot interferometer of claim 22, wherein the material is incompressible and the compliant support undergoes no volume change during deformation, said material exhibiting an energy cost of misalignment of the movable mirror that is at least an order of magnitude greater than the energy cost of deformation thereby self-stabilizing the movable mirror.

26. The tunable Fabry-Perot interferometer of claim 22, wherein the material exhibits a normal stress that provides a force on the movable mirror perpendicular to the direction of motion thereby further self-stabilizing the movable mirror.

27. A tunable Fabry-Perot interferometer, comprising:

a fixed partially reflective mirror;

a movable partially reflective mirror disposed parallel to the fixed mirror;

a compliant support that supports the movable mirror so as to permit variable dimensioning of an optical Fabry-Perot interferometer cavity formed between the fixed and movable mirrors, said compliant support being formed of a material that lies outside the cavity and exhibits an entropic plateau region; and an actuator that applies a force to said movable mirror that deforms the compliant support without causing a volume change in the material to control said variable dimensioning, said material exhibiting an energy cost of misalignment of the movable mirror that is at least an order of magnitude greater than the energy cost of deformation thereby self-stabilizing the movable mirror.

28. The tunable Fabry-Perot interferometer of claim 27, wherein said variable dimensioning scans a filter function across a range of wavelengths at a scan rate, the entropic plateau region extending over multiple frequency decade with an upper corner frequency at least one order of magnitude greater than the scan rate.

29. The tunable Fabry-Perot interferometer of claim 27, wherein said variable dimensioning deforms the compliant support over a deformation range, the material, hence the compliant support exhibiting a linear elastic behavior over the entire deformation range.

30. The tunable Fabry-Perot interferometer of claim 27, wherein the sleeve has an aspect ratio greater than 10.

31. The tunable Fabry-Perot interferometer of claim 27, wherein the material exhibits a normal stress that provides a force on the movable mirror perpendicular to the direction of motion thereby further self-stabilizing the movable mirror.

32. A tunable Fabry-Perot interferometer, comprising:

a fixed partially reflective mirror;

a movable partially reflective mirror disposed parallel to the fixed mirror;

a compliant diaphragm that supports the movable mirror so as to permit variable dimensioning of an optical Fabry-Perot interferometer cavity formed between the fixed and movable mirrors, said diaphragm being formed of a material that exhibits an entropic plateau region; and an actuator for creating field lines that apply a force to said movable mirror that deforms the compliant support, which undergoes tensile/compressive deformation, and controls said variable dimensioning as a function of an electric command signal.

33. The tunable Fabry-Perot interferometer of claim 32, wherein the material exhibits a Young's modulus less than 5 Mpa in the entropic plateau region.

34. The tunable Fabry-Perot interferometer of claim 32, wherein said variable dimensioning scans a filter function across a range of wavelengths at a scan rate, the entropic plateau region extending over multiple frequency decade with an upper corner frequency at least one order of magnitude greater than the scan rate.

35. The tunable Fabry-Perot interferometer of claim 32, wherein said variable dimensioning deforms the compliant support over a deformation range, the material, hence the compliant support exhibiting a linear elastic behavior over the entire deformation range.

36. The tunable Fabry-Perot interferometer of claim 32, wherein the diaphragm has an aspect ratio less than 1.

* * * * *